(12) United States Patent
Turchetta (10) Patent No.: US 12,516,928 B2
(45) Date of Patent: Jan. 6, 2026

(54) PROCESS FOR DETECTING THE POSITION OF DEFECTS IN METAL BARS

(71) Applicant: MULTISERVIZI INTEGRATI SRL, Rome (IT)

(72) Inventor: Bruno Turchetta, Rome (IT)

(73) Assignee: Multiservizi Integrati SRL, Rome (IT)

( * ) Notice: Subject to any disclaimer, the term of this patent is extended or adjusted under 35 U.S.C. 154(b) by 327 days.

(21) Appl. No.: 18/319,251

(22) Filed: May 17, 2023

(65) Prior Publication Data

US 2023/0375339 A1    Nov. 23, 2023

(30) Foreign Application Priority Data

May 18, 2022    (IT) ........................ 102022000010325

(51) Int. Cl.

| | |
|---|---|
| *G01B 17/04* | (2006.01) |
| *G01B 5/02* | (2006.01) |
| *G01B 7/02* | (2006.01) |
| *G01B 17/00* | (2006.01) |
| *G01N 29/04* | (2006.01) |
| *G01N 29/07* | (2006.01) |
| *G01N 29/24* | (2006.01) |
| *G01N 29/44* | (2006.01) |
| *G01N 29/46* | (2006.01) |

(52) U.S. Cl.
CPC ............... *G01B 17/04* (2013.01); *G01B 5/02* (2013.01); *G01B 7/02* (2013.01); *G01B 17/00* (2013.01); *G01N 29/045* (2013.01); *G01N 29/07* (2013.01); *G01N 29/2437* (2013.01); *G01N 29/4409* (2013.01); *G01N 29/46* (2013.01)

(58) Field of Classification Search
CPC .......... G01B 17/00; G01B 17/04; G01B 5/02; G01B 7/02; G01N 29/07; G01N 29/045; G01N 29/4409; G01N 29/2437; G01N 29/46

See application file for complete search history.

(56) References Cited

U.S. PATENT DOCUMENTS

| | | | |
|---|---|---|---|
| 2003/0216829 A1* | 11/2003 | Andrews | .................. G01N 3/34 |
| | | | 702/56 |
| 2011/0056298 A1* | 3/2011 | O'keefe | ................. G01N 29/04 |
| | | | 73/622 |

(Continued)

FOREIGN PATENT DOCUMENTS

| | | |
|---|---|---|
| IT | 2018-00006069 A1 | 12/2019 |
| JP | H10-9847 A | 1/1998 |
| JP | 2019/211308 A | 12/2019 |

*Primary Examiner* — Helen C Kwok
(74) *Attorney, Agent, or Firm* — Knobbe, Martens, Olson & Bear, LLP (57) ABSTRACT

A process for detecting the presence and position of defects in metal bars can include: measuring the velocity of longitudinal sound propagation in a metal bar; acquire the Fourier spectrum of an intact, defect-free metal bar comprised of the same composition structural and length as metal bar under examination; comparing the Fourier of the metal bar and a metal bar having similar composition and length; and in response to presence of any extra spectral lines due to the presence of defects in the metal bar under examination, identifying the frequency f of said extra spectral lines and obtaining the distance x of a defect from one end of the metal bar under examination.

4 Claims, 5 Drawing Sheets

(56) References Cited

U.S. PATENT DOCUMENTS

2017/0322011 A1* 11/2017 Guddati .................... G01B 5/02
2017/0343514 A1* 11/2017 Takata ................. G01N 29/048
2017/0343516 A1* 11/2017 Matsunaga ........ G01N 29/4436

* cited by examiner

PROCESS FOR DETECTING THE POSITION OF DEFECTS IN METAL BARS

TECHNICAL FIELD

The present disclosure relates to a process for detecting the position of defects in metal bars. In particular, the object of the present disclosure is a process for detecting the position of such defects which exploits the propagation of acoustic waves in materials.

BACKGROUND

The propagation of acoustic waves in solids is a well characterised phenomenon and is of interest in physics, engineering, materials science and applied sciences. The phenomenon is due to infinitesimal oscillations of the lattice structures of the solids which originate pressure waves similar to the ones giving rise to sound effects in air. Considering, by way of example, a bar with a length L and a round cross section with a radius R, a percussion wave is an acoustic wave due to a percussive excitation originated at one end of the bar. If the latter is spatially limited and has at least one free end, the phenomenon of stationary waves will be triggered.

A longitudinal acoustic wave that propagates in a solid bar having a single extended dimension, namely the one along which the excitations can travel, has a fundamental frequency $f=n(v/2L)$ with $n=1$, wherein v is the velocity of sound propagation in the solid and L is the length of said solid. For $n=2, 3, 4, \ldots$ higher harmonics of the oscillations are obtained. The fundamental frequency and subsequent harmonics give rise to the Fourier excitation spectrum.

The phenomenon described in the previous paragraph has been represented in JP 2019211308 and in IT102018000006069. In particular, in IT102018000006069 the phenomenon was described in order to identify the length of iron joints for foundation or containment posts already set in place and consequently partly buried. The object of IT102018000006069 is a device comprising a piezoelectric sensor securely fixed to a supporting base, which is in turn anchored (removably, however) to the solid body whose length it is desired to measure. A spectrum analyser enables an analysis of the harmonic content of the signals at the inlet thereof.

The piezoelectric sensor, by transforming vibrational mechanical energy into electricity, is capable of detecting the infinitesimal vibrations of the solid due to percussive excitations and transforming them into an electric potential difference. This electric potential difference contains information on the harmonic waves making it up, and their respective frequencies. The spectrum analyser thus enables Fourier spectrum analysis, and spectral lines corresponding to the frequencies described above can be observed. Subsequently, by inverting the formula $f=(v/2L)$, where the velocity of sound propagation v in the specific material is known, one obtains the length L of the bar.

However, the above-described process can be used with precision only if the bar whose length must be measured is intact and free of impediments to longitudinal propagation of the excitations.

Thus, in this specific sector, there exists a need to determine the length of metal bars also in the case of materials that show defects caused by manufacturing problems or effects generated over time due to exposure to corrosive elements or traumas caused by strong excitations, for example seismic ones.

SUMMARY

This need is satisfied by the process according to the present disclosure, which offers the possibility of determining the position of defects in bars, as well as having further advantages that will emerge clearly below.

Implementations of the present disclosure propose, in fact, a process that comprises generating mechanical excitations at the ends of metal bars in order to detect discontinuities and defects in the shape of the bars, in particular joists, thanks to the modification of the Fourier spectrum which said defects can generate. In fact, if the solid contains a defect, the reflections that are generated when the waves impact on the defect will generate stationary waves from the point where the defect is located to the ends of the solid.

An aim of disclosed implementations is thus to provide a process for detecting the position of defects in metal bars, in particular metal bars not accessible to direct viewing, and which allows for overcoming the limits established by the prior art and achieving the technical results described previously.

A further aim of is that the proposed process can be carried out with very low production and operating costs. Yet another aim is to propose a process that is simple, safe and reliable.

The effectiveness of the process according to some implementations is evident, as it allows one to identify the position of defects in metal parts used, for example, in construction (residential, road, industrial), be they iron joists or multi-strand steel cables. The possibility of identifying defects, corrosion and breakage in these mechanical parts represents an important development for the purpose of securing the safety of viaducts, bridges or buildings. In fact, disclosed implementations allow to detect the presence and position of defects in metal bars in order to fix or discard said metal bars.

Therefore, a specific object of disclosed implementations is a process for detecting the presence and position of defects in metal bars, comprising the following steps:

detecting the velocity v of longitudinal sound propagation in a metal bar having the same structural composition as the one under examination, i.e. in a metal solid, wherein there exists a "dominant" direction of propagation for the acoustic waves, i.e. wherein the propagation of excitations is essentially one-dimensional, in particular, detecting the velocity by reference to stored data or by means of striking with a percussion device a metal bar of known length L at one end, detecting with a piezoelectric sensor the fundamental frequency f and the harmonic frequencies and calculate, with a calculating device, the velocity v from the formula $f=v/2L$, detecting the Fourier spectrum of an intact, defect-free metal bar having the same structural composition and the same length as the metal bar under examination, by reference to stored data or by analyzing the fundamental frequency f and the harmonic frequencies by means of a spectrum analyser, electrically coupled to said piezoelectric sensor;

acquiring the Fourier spectrum of the metal bar under examination, by means of striking with a percussion device a metal bar of know length L at one end, detecting with a piezoelectric sensor the fundament frequency f and the harmonic frequencies, and analysing the fundamental frequency f and the harmonic frequencies by means of a spectrum analyser, electrically coupled to said piezoelectric sensor;

comparing by means of a spectrum analyser the two spectra obtained and identifying the presence of any extra spectral lines present and due to the presence of defects in the metal bar under examination; also comparing the noise spectrum (background noise) in the two cases; and if extra spectral lines are present:
identifying the frequency f of said extra spectral lines by means of a spectrum analyser;
applying with a calculating device the formula f=v/2x to the extra spectral lines present in the spectrum of the bar under examination in order to obtain the distance x of said defect from one end of the bar under examination, the previously determined velocity v of sound propagation and the frequency f being known. The extra spectral lines are in fact generated by reflections that occur in the points where the defects are located and thus correspond to localised stationary waves between the ends of the bar and the point where the defect is located.

In particular, according to the invention, the step of acquiring the spectrum can comprise the following steps:
welding a piezoelectric sensor, electrically coupled to a spectrum analyser, to the metal bar under examination;
striking the metal bar under examination at one end;
analysing the electric signal output by the piezoelectric sensor with said spectrum analyser.

Again according to the invention, the step of measuring the velocity v of sound propagation in the metal bar under examination can comprise the following steps:
welding the piezoelectric sensor to an intact "one-dimensional" metal bar of known length L, said piezoelectric sensor being electrically coupled to a spectrum analyser;
striking the metal bar under examination at one end;
analysing the electric signal output by the piezoelectric sensor with said spectrum analyser;
identifying the fundamental frequency f in the Fourier spectrum obtained from the previous step by means of a spectrum analyser;
applying with a calculating device the formula f=v/2L in order to obtain the velocity v of sound propagation in said metal bar, the length L of said metal bar and the fundamental frequency f being known.

BRIEF DESCRIPTION OF THE DRAWINGS

Implementations will be described below by way of non-limiting illustration, with particular reference to several examples and the figures of the appended drawings, wherein.

DETAILED DESCRIPTION

Figure 1:
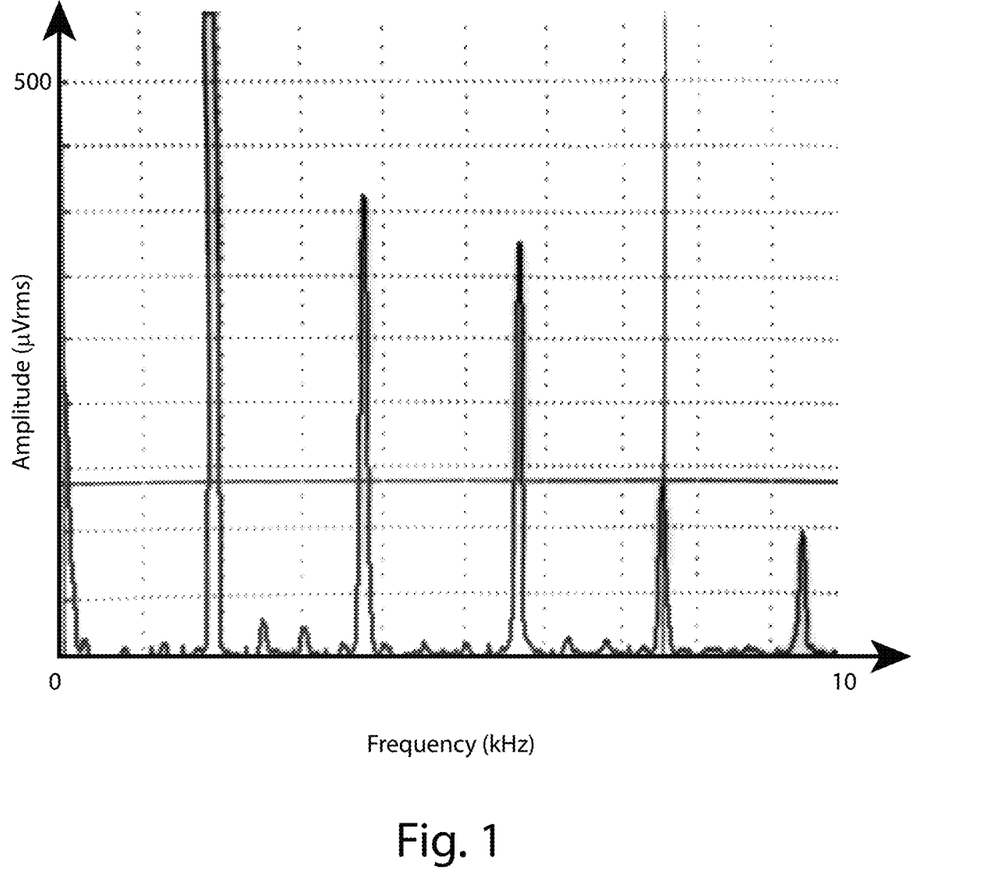
FIG. 1 shows the Fourier spectrum obtained in an intact Anticorodal® aluminium bar of a first illustrative example.
Figure 2:
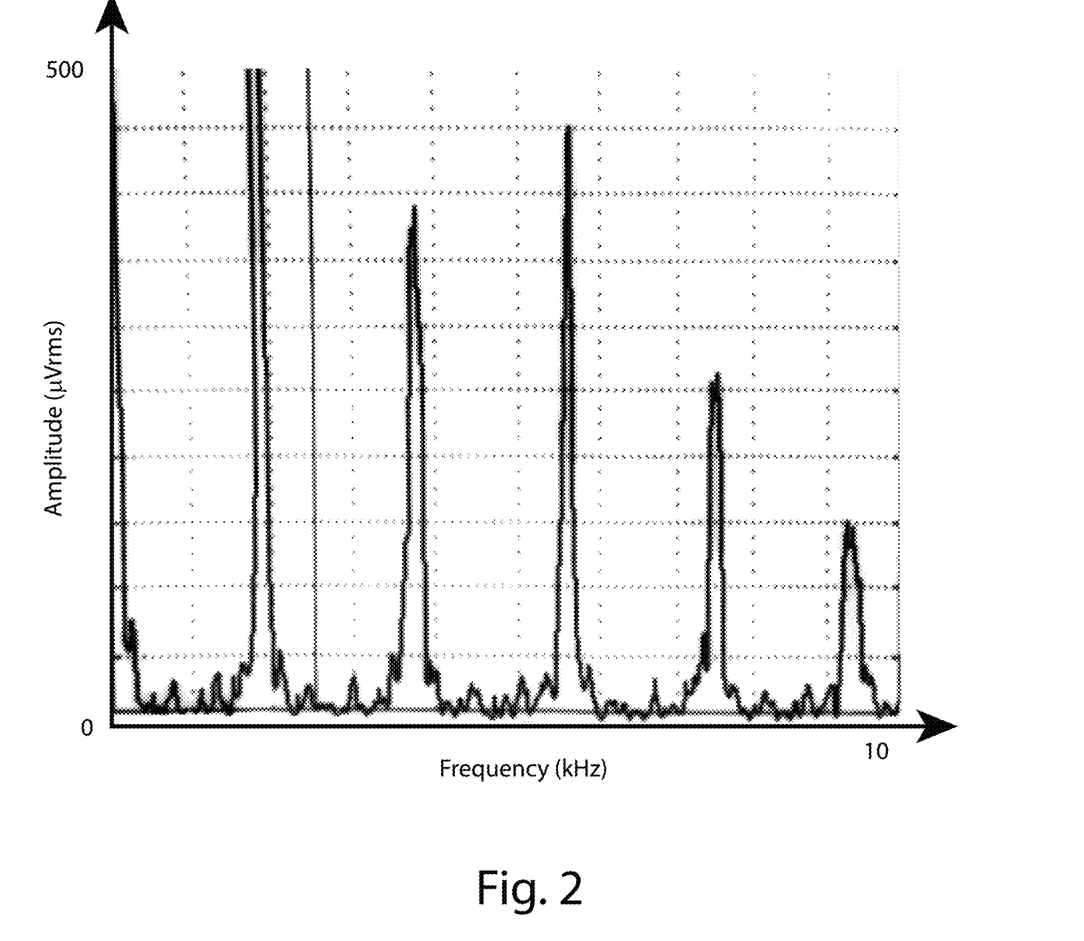
FIG. 2 shows the Fourier spectrum obtained in an Anticorodal® aluminium bar with an irregular cut of a first illustrative example.
Figure 3:
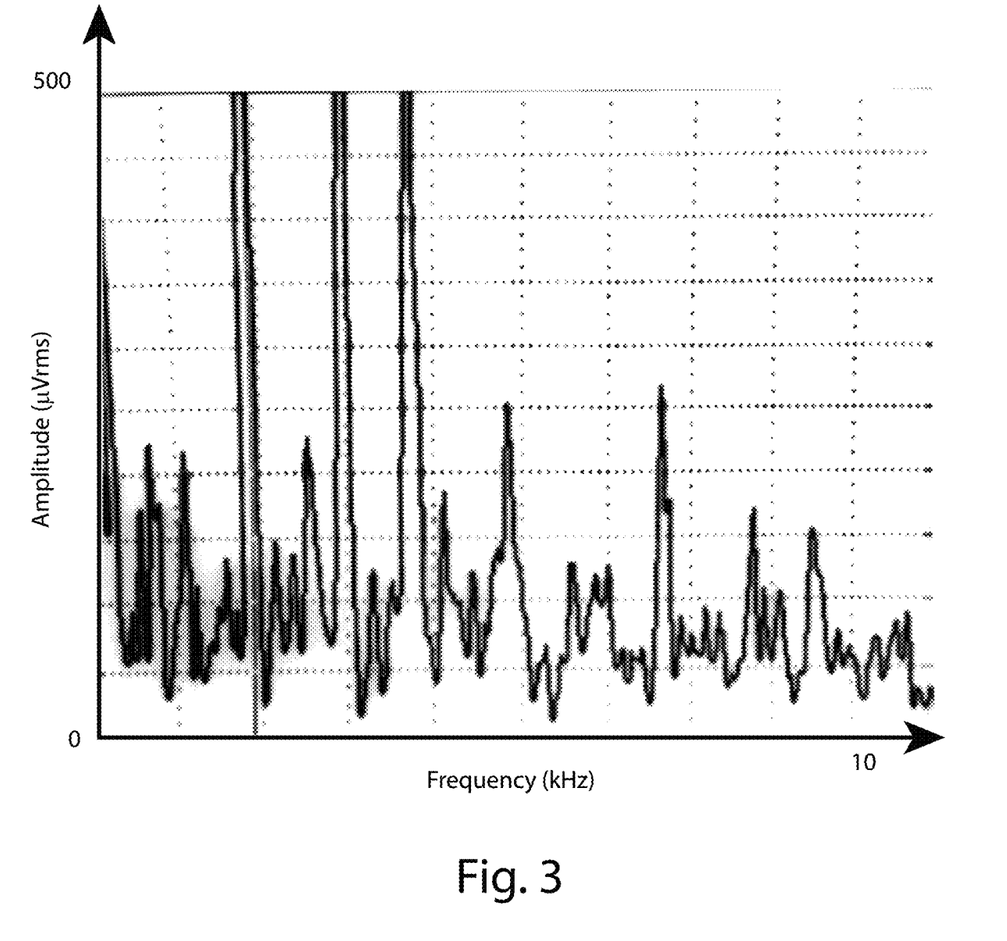
FIG. 3 shows the Fourier spectrum obtained in the same Anticorodal® aluminium bar as in the previous figures, but with a deeper cut.

Example 1. Identification of the Position of a Defect in a Bar of Anticorodal® Aluminium Considering a cylindrical bar made of Anticorodal® aluminium (aluminium-silicon-magnesium-manganese alloy) with a diameter of 4 cm and length=1.293 m, by applying a slight percussive excitation at one end of the bar and using a piezoelectric sensor and a spectrum analyser, the Fourier spectrum shown in FIG. 1 was obtained. In the spectrum obtained, the fundamental frequency of 1900 Hz is clearly visible. Knowing the length L and the fundamental frequency f, the velocity of propagation v=4913 m/s was calculated by inverting the formula f=(v/2L). The subsequent harmonics respectively at 3800 Hz (n=2), 5700 Hz (n=3), 7600 Hz (n=4), and up to the fifth at 9500 Hz (n=5) are also regular and clearly visible from the Fourier spectrum. After the velocity v of sound propagation was measured, the bar was mechanically treated by creating therein a regular groove with a depth of 1 cm and implementing the process, thereby obtaining the Fourier spectrum of the new bar. When comparing the two spectra obtained, one noted the absence of substantial modifications between them. Subsequently, the groove was damaged with a saw for metals, which produced an irregular cut in the metal bar, and the process was applied. The new Fourier spectrum shown in FIG. 2 appeared very different from the one in FIG. 1. In particular, the width of the spectral lines increased, and their height did not decrease as the number of harmonics increased; in particular, the third harmonic had a larger amplitude than the second. Moreover, the noise at the base of the spectral lines increased. At this point, further damage was produced in the same point, again by means of a saw for metals, thereby increasing the depth of the cut on the connection part and generating the spectrum in FIG. 3, which appeared different also from the one in FIG. 2. In fact, one noted a substantial increase in the background noise and a strong extra component between the first and second harmonics. This component appeared at a frequency of 2950 Hz. By applying the final steps of the process it was possible to calculate the position of the defect in the bar, which corresponded to a distance x=0.88 m from one end of the bar.

Figure 4A:
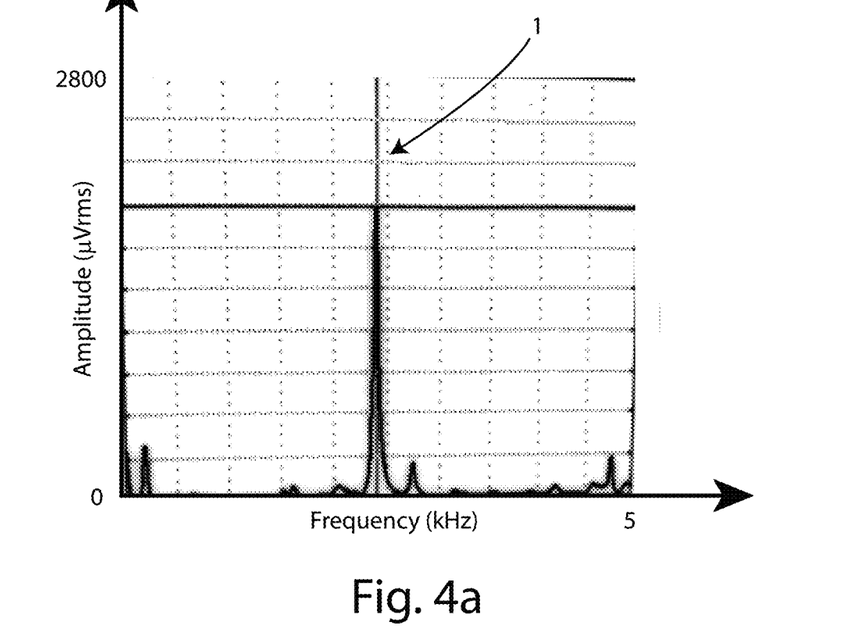
FIGS. 4*a* and 4*b* show the Fourier spectrum of an intact stainless steel bar and an intact Anticorodal® aluminium bar of a second illustrative example.
Figure 4B:
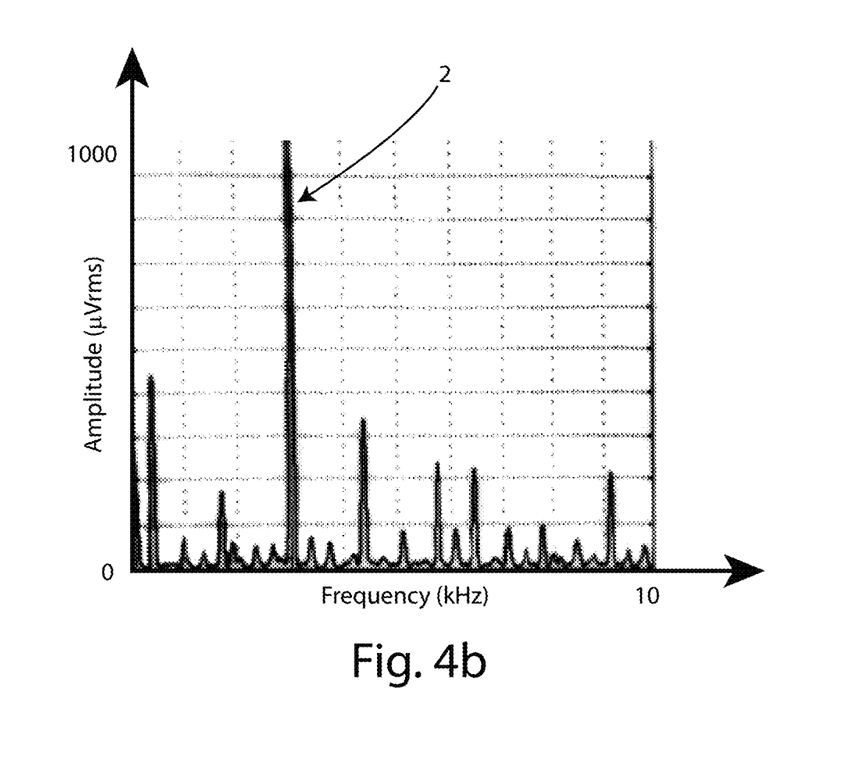
Figure 5:
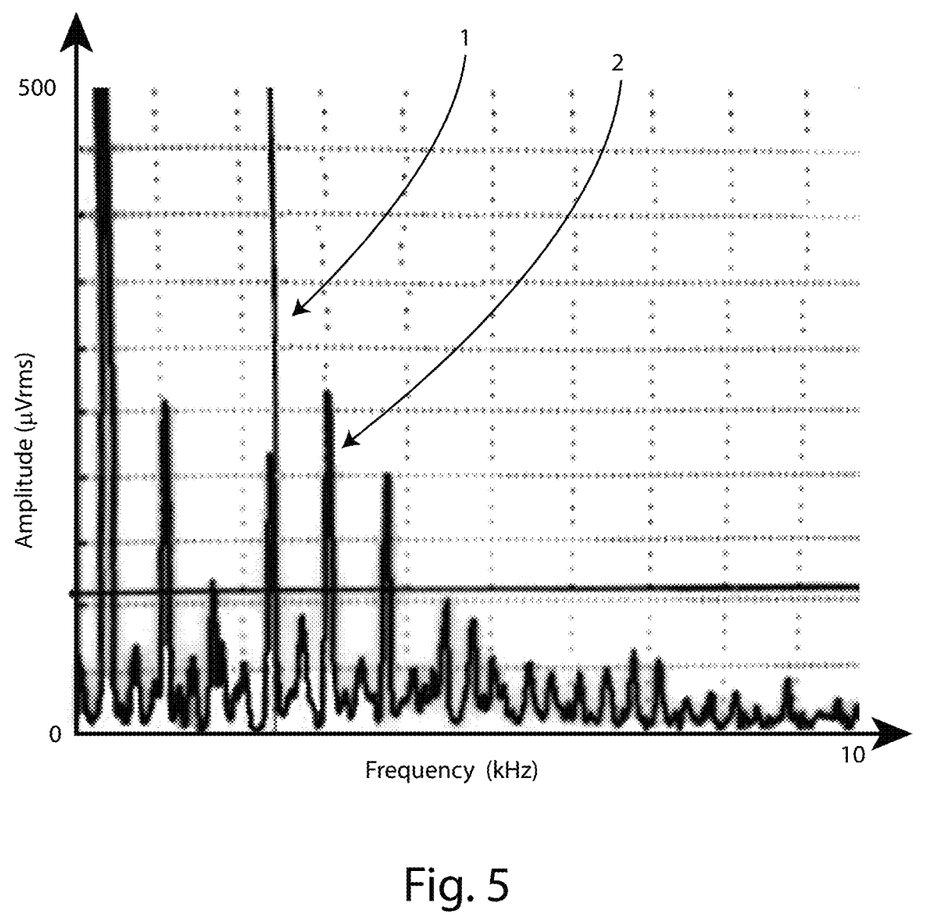
FIG. 5 shows the Fourier spectrum obtained by placing the two bars of the previous figure in contact.

Example 2. Identification of the Position of the Point of Contact Between a Stainless Steel Bar and an Anticorodal Aluminium Bar Two bars, one made of stainless steel and the other of Anticorodal® aluminium, both with a 4 cm square cross section and respective lengths of 1.048 m and 0.757 m, were placed in contact (only in contact, not welded or glued). Exciting one of the ends of the two bars with a percussion when they were not in contact generated the spectra shown in FIGS. 4*a* and 4*b*. The steel—spectrum in FIG. 4*a*—resounded at a fundamental frequency of 2400 Hz, indicated by the reference number 1, corresponding to a velocity of sound propagation of 5030 m/s, whereas the Anticorodal® aluminium—spectrum in FIG. 4*b*—had its fundamental resonance at 3050 Hz, indicated by the reference number 2, corresponding to a velocity of sound propagation of 4617 m/s. In particular, it is probable that the Anticorodal® aluminium was a different alloy compared to the one in the previous example and for this reason a 6% difference in the velocity of propagation was detected. This difference demonstrates the necessity of determining the velocity of sound propagation for every specific case. When the two bars were placed in contact and the percussive excitation was applied to one of the ends of the two bars, the spectrum shown in FIG. 5 was obtained. Said spectrum contained both the spectral line 1 of the steel at 2400 Hz and the spectral line 2 of the Anticorodal® aluminium at 3050 Hz. Therefore, the spectrum obtained by placing the bars in contact contained the information related to the length of both elements and this demonstrated the possibility of locating the defect, understood in this case as the point of contact between the bars.

Other Variations

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, can be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated and/or disclosed may differ from those shown in the figures. Depending on the embodiment, certain of the steps described above may be removed, others may be added. For example, the actual steps and/or order of steps taken in the disclosed processes may differ from those shown in the figure. Depending on the embodiment, certain of the steps described above may be removed, others may be added. For instance, the various components illustrated in the figures or described herein may be implemented as software and/or firmware on a processor, controller, ASIC, FPGA, and/or dedicated hardware. The software or firmware can include instructions stored in a non-transitory computer-readable memory. The instructions can be executed by a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Conditional language used herein, such as, among others, "can," "could", "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language, such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

Implementations have been described by way of non-limiting illustration, according to the preferred embodiments thereof, but it is understood that variations and/or modifications may be introduced by persons skilled in the art without going beyond the relevant scope of protection, as defined by the appended claims.

What is claimed is:

1. A process for detecting the presence and position of defects in metal bars, comprising:
   detecting the velocity v of longitudinal sound propagation in a metal bar having the same structural composition as the one under examination, by reference to stored data or by striking with a percussion device a metal bar of known length L at one end, detecting with a piezo-electric sensor the fundamental frequency f and the harmonic frequencies and calculate, with a calculating device, the velocity v from the formula f=v/2L;
   detecting the Fourier spectrum of an intact, defect-free metal bar having the same structural composition and the same length as the metal bar under examination, by reference to stored data or by analyzing the fundamental frequency f and the harmonic frequencies by a spectrum analyser, electrically coupled to said piezoelectric sensor;

acquiring the Fourier spectrum of the metal bar under examination, by striking with the percussion device the metal bar of know length L at one end, detecting with the piezoelectric sensor the fundament frequency f and the harmonic frequencies, and analysing the fundamental frequency f and the harmonic frequencies by the spectrum analyser, electrically coupled to said piezoelectric sensor;

comparing by the spectrum analyser the two Fourier spectrums obtained and identifying the presence of any extra spectral lines present and due to the presence of defects in the metal bar under examination; and if said extra spectral lines are present:

identifying the fundamental frequency f of said extra spectral lines by the spectrum analyser;

applying with the calculating device the formula $f=v/2x$ to the extra spectral lines present in the Fourier spectrum of the metal bar under examination in order to obtain a distance x of said defects from one end of the bar under examination, the velocity v of sound propagation and the fundamental frequency f being known.

2. The process for detecting the position of defects in metal bars according to claim 1, wherein said acquiring of the Fourier spectrum comprises:

welding the piezoelectric sensor, electrically coupled to the spectrum analyser, to the metal bar under examination;

striking the metal bar under examination at one end;

analysing an electric signal output by the piezoelectric sensor with said spectrum analyser.

3. The process for detecting the position of defects in metal bars according to claim 2, wherein said detecting of the velocity v of sound propagation in the metal bar under examination comprises:

welding the piezoelectric sensor to the metal bar of known length L, said piezoelectric sensor being electrically coupled to the spectrum analyser;

striking the metal bar under examination at one end;

analysing the electric signal output by the piezoelectric sensor with said spectrum analyser;

identifying the fundamental frequency f in the Fourier spectrum obtained from said analysing by the spectrum analyser;

applying with the calculating device the formula $f=v/2L$ in order to obtain the velocity v of sound propagation in said metal bar, the length L of said metal bar and the fundamental frequency f being known.

4. The process for detecting the position of defects in metal bars according to claim 1, wherein said detecting of the velocity v of sound propagation in the metal bar under examination comprises:

welding the piezoelectric sensor to the metal bar of known length L, said piezoelectric sensor being electrically coupled to the spectrum analyser;

striking the metal bar under examination at one end;

analysing an electric signal output by the piezoelectric sensor with said spectrum analyser;

identifying the fundamental frequency f in the Fourier spectrum obtained from said analysing by the spectrum analyser;

applying with the calculating device the formula $f=v/2L$ in order to obtain the velocity v of sound propagation in said metal bar, the length L of said metal bar and the fundamental frequency f being known.

\* \* \* \* \*